US00RE37983E

(19) United States
(12) Reissued Patent
Wang

(10) Patent Number: US RE37,983 E
(45) Date of Reissued Patent: Feb. 11, 2003

(54) AIR PUMP

(75) Inventor: Kenneth Wang, Taipei (TW)

(73) Assignee: Team Worldwide Corporation (TW)

(21) Appl. No.: 09/688,736

(22) Filed: Oct. 17, 2000

Related U.S. Patent Documents

Reissue of:
(64) Patent No.: 5,827,052
Issued: Oct. 27, 1998
Appl. No.: 08/756,904
Filed: Dec. 2, 1996

(51) Int. Cl.[7] ..... F04B 43/08
(52) U.S. Cl. ..... 417/478; 417/472; 5/454; 5/706; 92/91
(58) Field of Search ..... 92/34, 91, 92; 5/706, 708; 417/478, 472, 437, 328

(56) References Cited

U.S. PATENT DOCUMENTS

| | | | | | |
|---|---|---|---|---|---|
| 2,204,738 | A | * | 6/1940 | Swan | 417/472 |
| 2,686,006 | A | * | 8/1954 | Hasselquist | 417/437 |
| 2,698,028 | A | * | 12/1954 | Lee et al. | 5/706 |
| 3,068,494 | A | * | 12/1962 | Pinkwater | 5/708 |
| 3,128,480 | A | * | 4/1964 | Lineback | 5/706 |
| 3,216,413 | A | * | 11/1965 | Arecheta Mota | 128/205.13 |
| 3,297,241 | A | * | 1/1967 | Andreasson | 417/437 |
| 4,531,330 | A | * | 7/1985 | Phillips | 52/2 |
| 4,862,533 | A | * | 9/1989 | Adams, III | 417/472 |
| 4,930,174 | A | * | 6/1990 | Hunter | 417/479 |
| 5,297,944 | A | * | 3/1994 | Pomeroy | 417/478 |
| 5,645,056 | A | * | 7/1997 | Pomeroy | 92/91 |

FOREIGN PATENT DOCUMENTS

| | | | | |
|---|---|---|---|---|
| DE | 4034593 A1 | * | 7/1992 | 417/472 |
| GB | 708759 | * | 5/1954 | 5/708 |

* cited by examiner

*Primary Examiner*—Charles G. Freay
*Assistant Examiner*—W Rodriquez
(74) *Attorney, Agent, or Firm*—Michael D. Bednarek; Shaw Pittman LLP

(57) ABSTRACT

An air pump comprises a hollow pump body, at least one pulling member, an air inlet and an air outlet. The hollow pump body has air inside and consist of flexible sides and two opposite stiff ends. The air outlet is provided on the pump body to discharge the air in the pump body when the pump body is pressed. The pulling member is attached to one of the stiff ends of the pump body in order to restore the pressed pump body by pulling the pulling member. The air inlet is provided on the pump body to suck outside air into the pump body when the stiff end is pulled by the pulling member to restore the shape of the pressed pump body.

6 Claims, 16 Drawing Sheets

AIR PUMP

Matter enclosed in heavy brackets [ ] appears in the original patent but forms no part of this reissue specification; matter printed in italics indicates the additions made by reissue.

BACKGROUND OF THE INVENTION

As shown in FIG. 9, an air pump (8) according to the first example of the prior art has a pump body (81) with a spring (82) received inside. The pump body (81) is made of flexible material, such as PVC, and can be flattened.

While operating the air pump (8), the user depresses it to discharge the air inside, through an air outlet (84), so that the pump body (81) is flattened and the spring (82) is compressed. Then, he releases the air pump (8). The pump body (81) is automatically restored under the action of the spring (82). Also, outside air is sucked into the air pump (8) through an air inlet (83). By repeating the above operations, the air pump (8) can continuously supply air.

Check valves are necessarily provided in the air inlet (83) and air outlet (84) in order to control the air to flow in a single direction. It is understood that various check valves can be used in the air pump (8) and are therefore not shown in FIG. 9.

Unfortunately, the pump body (81) made of flexible material is easily pricked by the spring (82) which is generally made of steel. Further, the air pump (8) cannot readily be packaged for sale and transport.

FIG. 10 shows another air pump (9) according to the second example of the prior art, in which a foam (92) is received in the pump body (91) of the air pump (9) and a bore (921) is provided in the foam (92). Reference numbers (93) and (94) are an air inlet and an air outlet.

The foam (92) has many pores itself and is elastic. When the user depresses the air pump (9), both the foam (92) and the pump body (91) are flattened. The air in the pores of the foam (92) is pushed out and is discharged to the outside of the air pump (9) through the air outlet (94). When the user releases the air pump (9), the foam (92) regains its original shape due to its own elasticity and outside air is sucked in the foam (92) through the air inlet (93) and the bore (921).

In this example, the foam (92) is expensive and requires a great deal of storage space. Moreover, the force applied to depress the foam (92) may cause permanent deformation to the foam (92) so that the air pump (9) fails to function properly.

SUMMARY OF THE INVENTION

An object of the present invention is to provide an air pump to overcome the problems of the prior art. The air pump of this invention comprises a hollow pump body, at least one pulling member, an air inlet and an air outlet. The hollow pump body has air inside and consists of flexible sides and two opposite stiff ends. The air outlet is provided on the pump body to discharge the air in the pump body when the pump body is pressed. The pulling member is attached to one of the stiff ends of the pump body in order to restore the pressed pump body to its original shape by pulling the pulling member. The air inlet is provided on the pump body to suck outside air into the pump body when the stiff end is pulled by the pulling member to restore the pressed pump body shape.

Alternatively, the air pump comprises a hollow pump body, an air inlet and an air outlet. The pump body has air inside and consists of flexible sides, a first and second curved ends which are stiff. The air outlet is provided on the first curved end (or at any proper position of the pump body) to discharge the air in the pump body when the first and second ends are pressed to flatten the pump body. The air inlet is provided on the second curved end (or at any proper position of the pump body) to suck outside air into the pump body when the first and second ends are pulled to restored the shape of the pump body.

Alternatively, the air pump of this invention comprises an inflatable pump body, an air inlet and an air outlet. An air chamber is formed and surrounded by the inflatable group body. The inside of the pump body is divided into a first air cell and a second air cell with an opening provided therebetween, and the air chamber and the first air cell respectively have a first air and a second air inside. The air outlet is mounted on the pump body to discharge the first air in the air chamber when the pump body is pressed by a force. The air inlet is mounted on the pump body to suck outside air into the air chamber when the force is released. The second air in the first air cell is pushed into the second air cell through the opening when the pump body is pressed by the force, and automatically flows back to the first air cell through the opening when the force is released.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
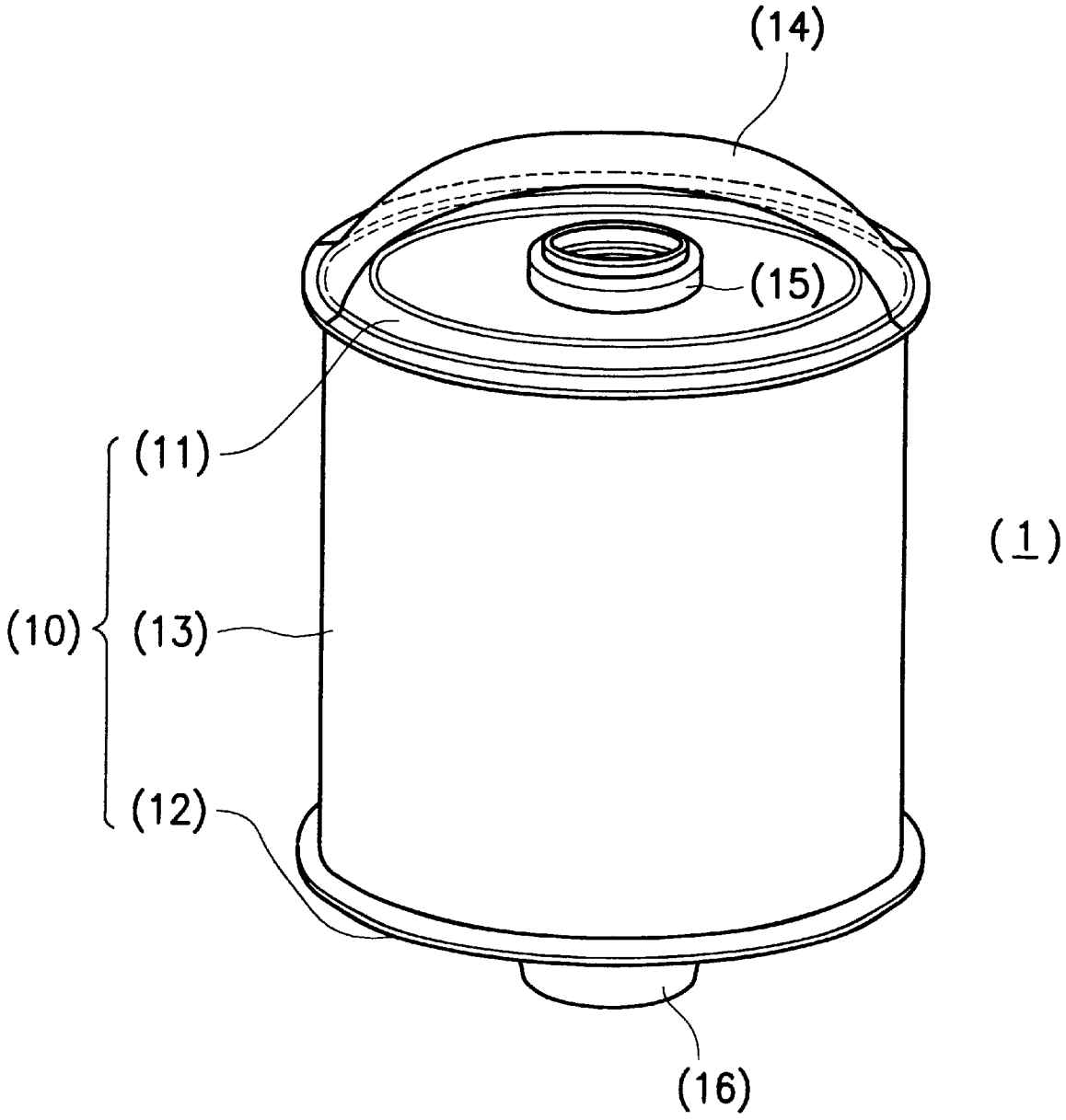
FIG. 1 shows an air pump according to an embodiment of this invention.

As shown in FIG. 1, an air pump 1, according to an embodiment of this invention has a pump body (10) and a band (14). The pump body (10) comprises stiff ends (11), (12) and flexible sides (13). The band (14) is attached to the end (11) of the pump body (10).

An air inlet (15) is provided on the end (11) while an air outlet (16) is provided on the other end (12). Also referring to FIG. 2A, two check valves (17), (18) are respectively provided in the air inlet (15) and outlet (16).

Figure 2B:
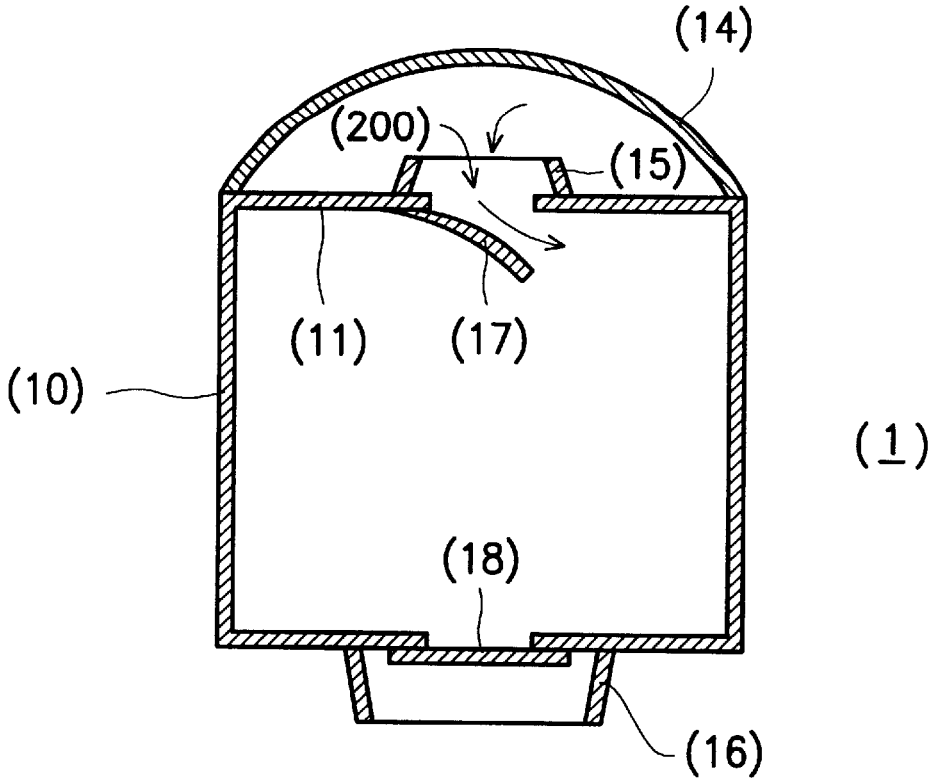
FIG. 2B is a sectional view of the air pump according to FIG. 1, when the air pump is released.
Figure 2A:
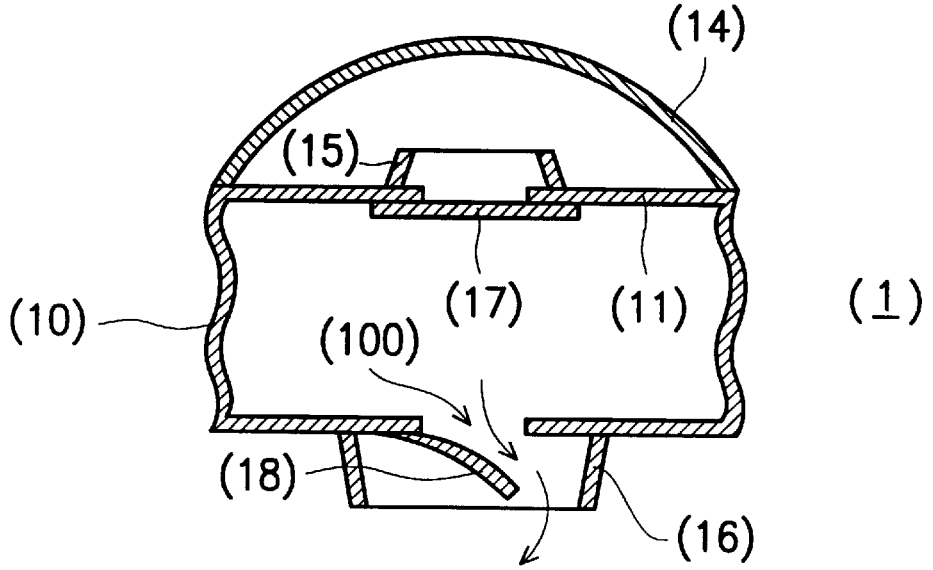
FIG. 2A is a sectional view of the air pump according to FIG. 1, when the air pump is depressed.

To operate the air pump (1), the user puts his hand or foot under the band (14) and depresses the end (11) of the pump body (10). As shown in FIG. 2A, the check valve (17) is closed but the check valve (18) is opened to discharge the air (100) in the pump body (10). Then, the user raises his hand or foot to lift up the end (11) of the pump body (10 by pulling the band (14). As shown in FIG. 2B, the check valve (18) is closed and the check valve (17) is opened to suck outside air (200) into the pump body (10). By repeating the above operations, the air pump (1) can continuously supply air.

Figure 3A:
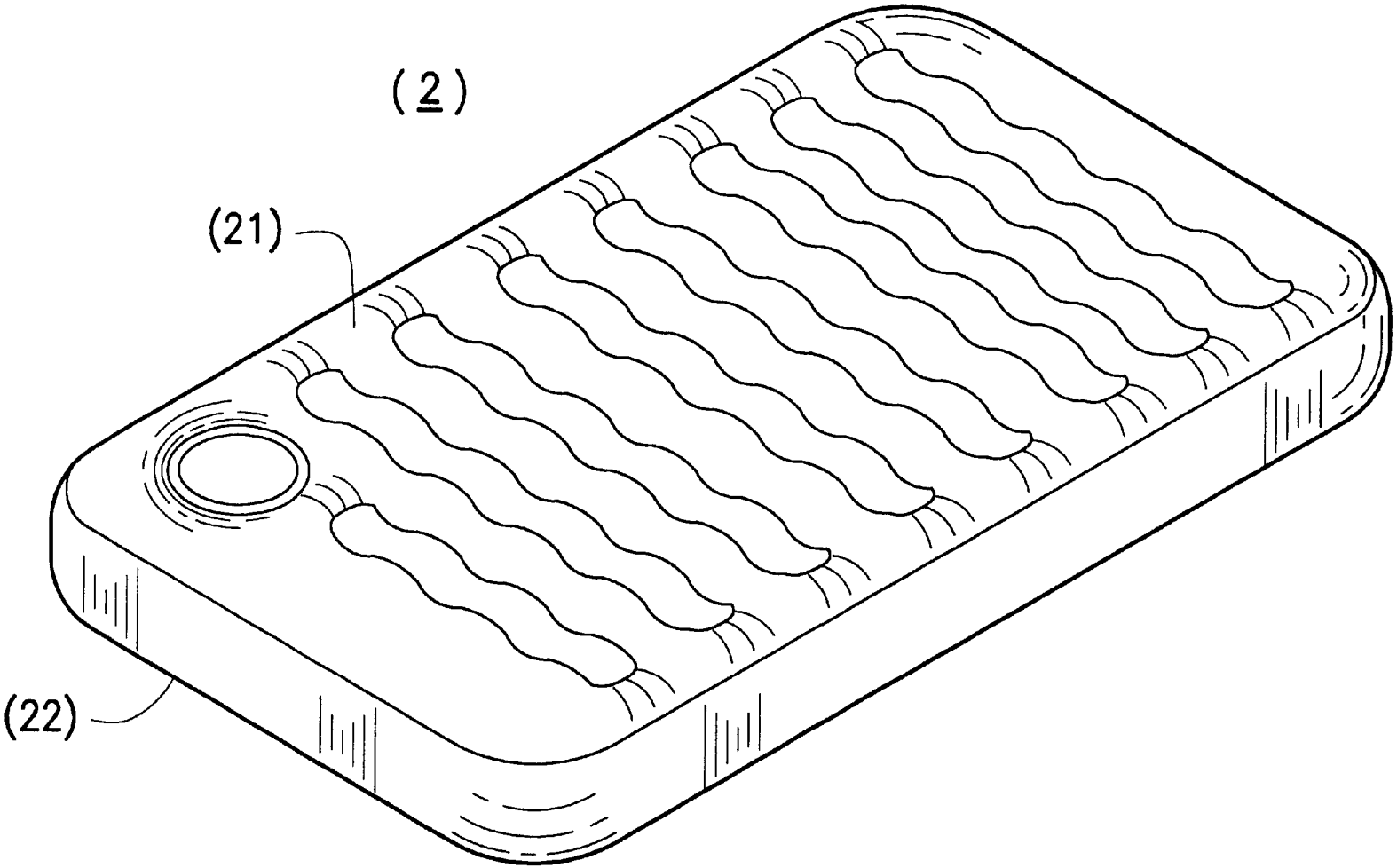
FIG. 3A and 3B show a first application example of this invention, wherein an air pump is mounted in an air mattress.
Figure 3B:
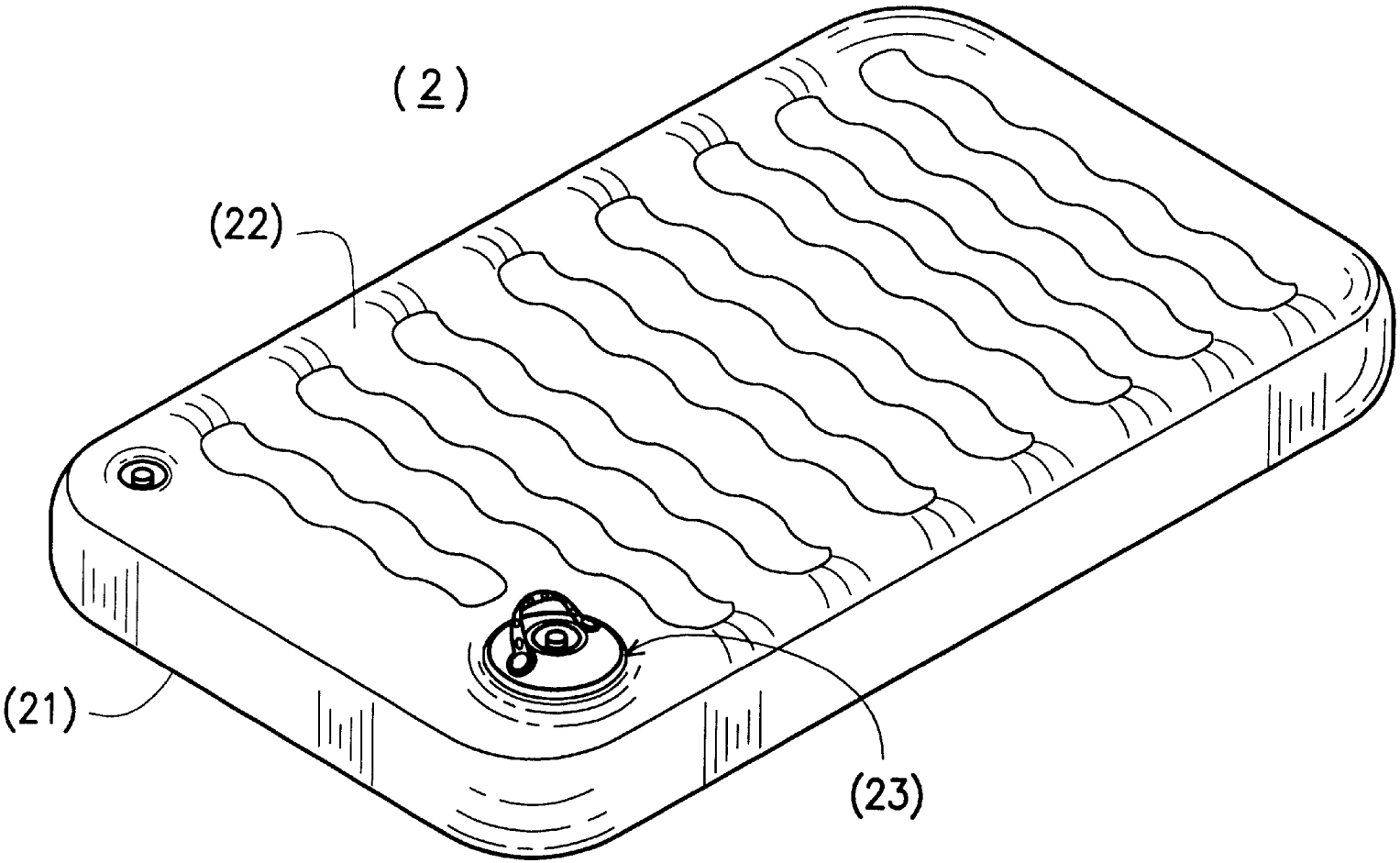
Figure 3C:
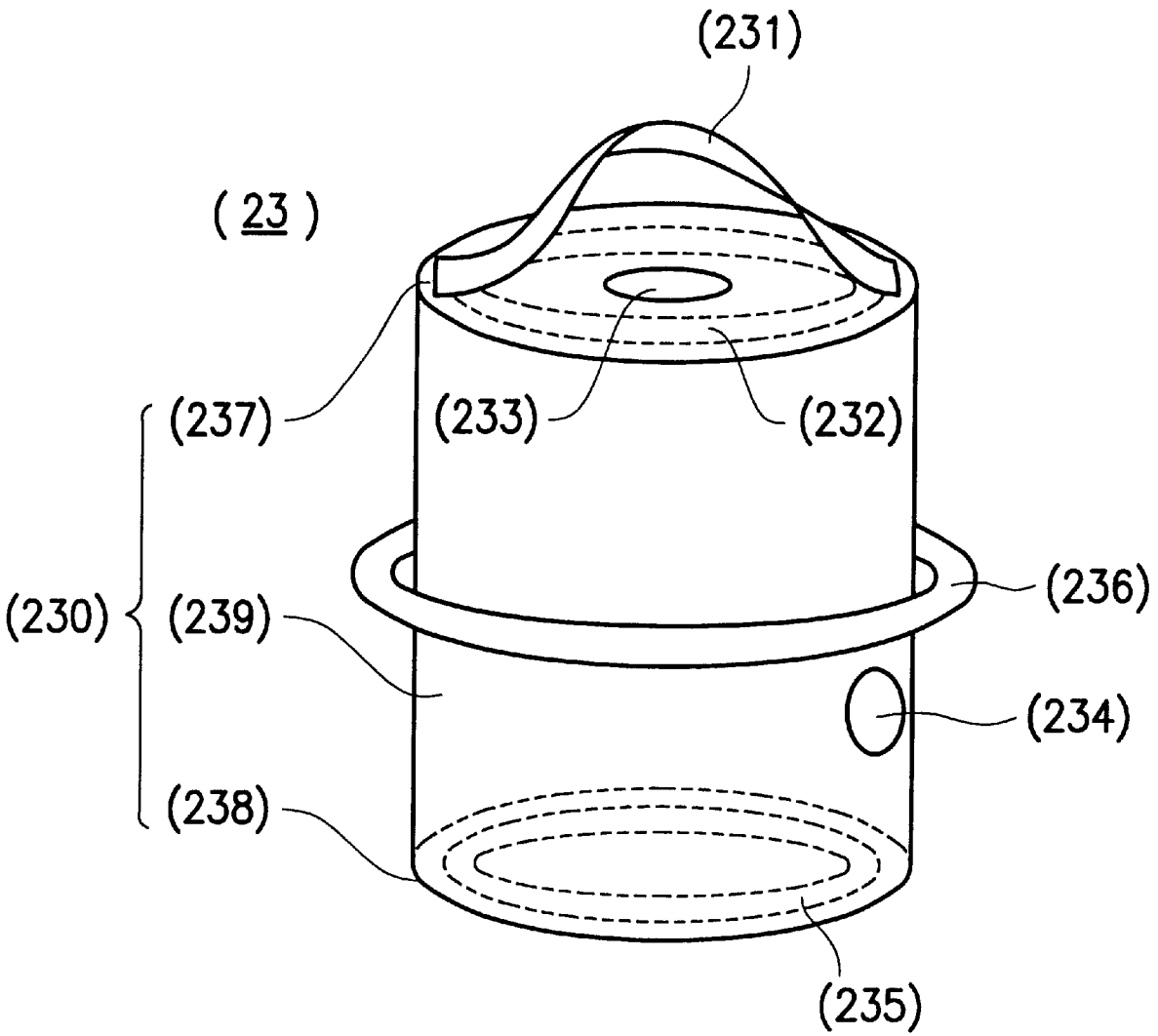
FIG. 3C shows the air pump in FIG. 3B.

FIG. 3A and 3B show a first application example of this invention, in which an air pump (23) is mounted in an air mattress (2) having a top surface (21) and a bottom surface (22). The user lies on the beautiful top surface (21) to enjoy the sunshine. Also referring to FIG. 3C, the air pump (23) has a pump body (230), a band (231) and a heavy sand ring (236). The sand ring (236) is movably provided around the pump body (23)), while the band (231) is attached to the end (237) of the pump body (230). The pump body (230) is flexible but has two stiff rings (232), (235) fixed on its ends (237), (238). Also, a check valve (233) is provided on its end (237) while another check valve (234) is provided on its sides (239).

Figure 3D:
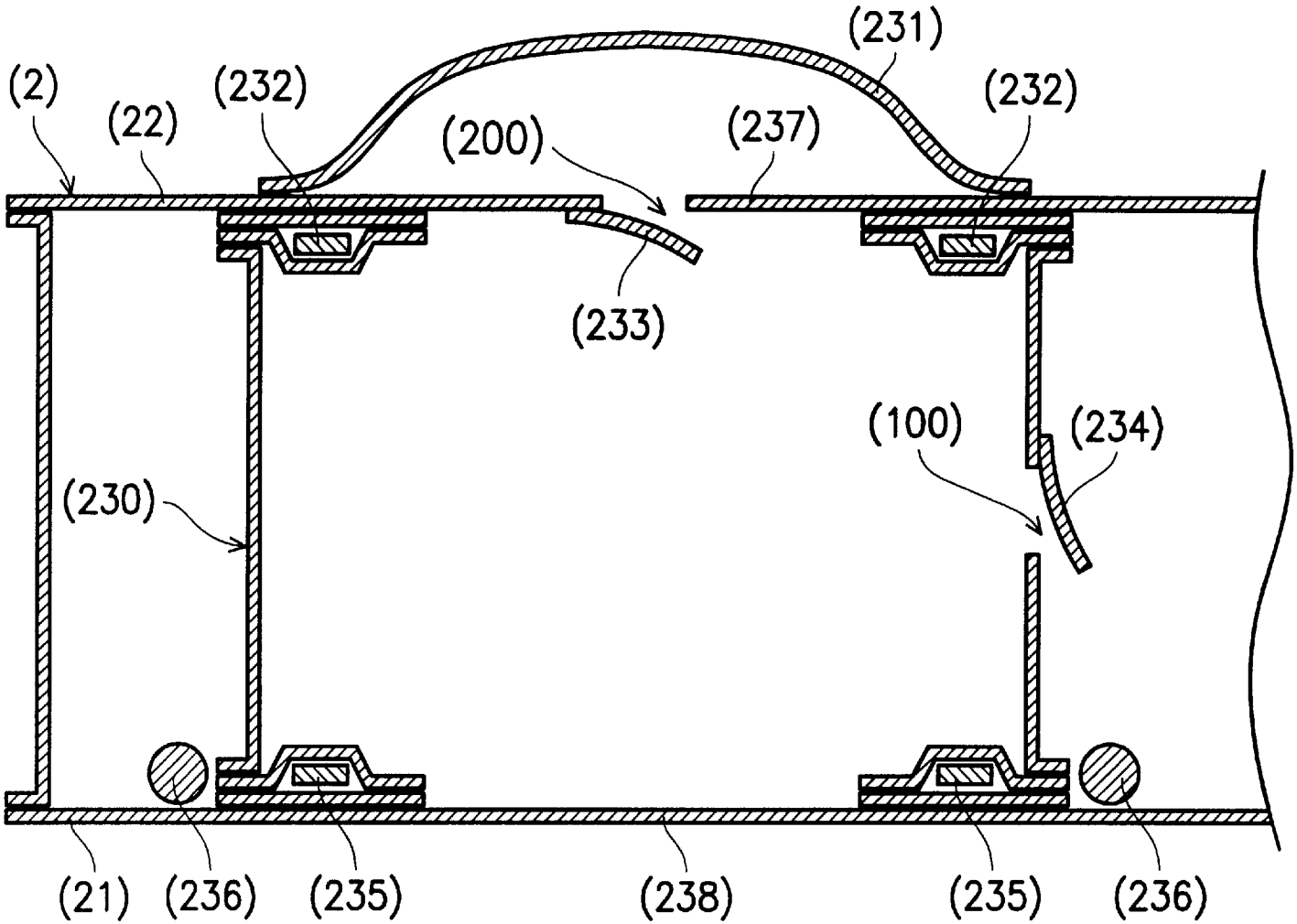
FIG. 3D is a sectional view of the air pump according to FIG. 3C.

FIG. 3D is a sectional view of the air pump (23) in the air mattress (2), wherein the top and bottom surfaces (21), (22) of the air mattress (2) are used as the ends (238), (237) of the air pump (23) to save material. Before pumping air into the air mattress (2), the user reverses the air mattresses (2), as shown in FIG. 3B, so that the bottom surface (22) or the air mattress (2) is up, and the heavy sand ring (236) lies on the top surface (21). Then, the user pulls the band (231) to lift up the end (237). The sand ring (236), lying on the top surface (21), resists the pull so that the pump body (230) can be expanded and the outside air (200) is sucked into the pump body (230) through the check valve (233). Then, he depresses the end (237) of the air pump (23) to push the air (100), through the check valve (234), into the air mattress (2), and the pump body (230) is flattened. The air mattress (2) can be filled with air by repeating the above operations.

Then, the user upturns the top surface (21) of the air mattress (2). The sand ring (236) falls down to the bottom surface (22) so that the bottom surface (22), rather than the top surface (21), suffers from its weight. Thus, the beautiful top surface (21) remains smooth.

Figure 4A:
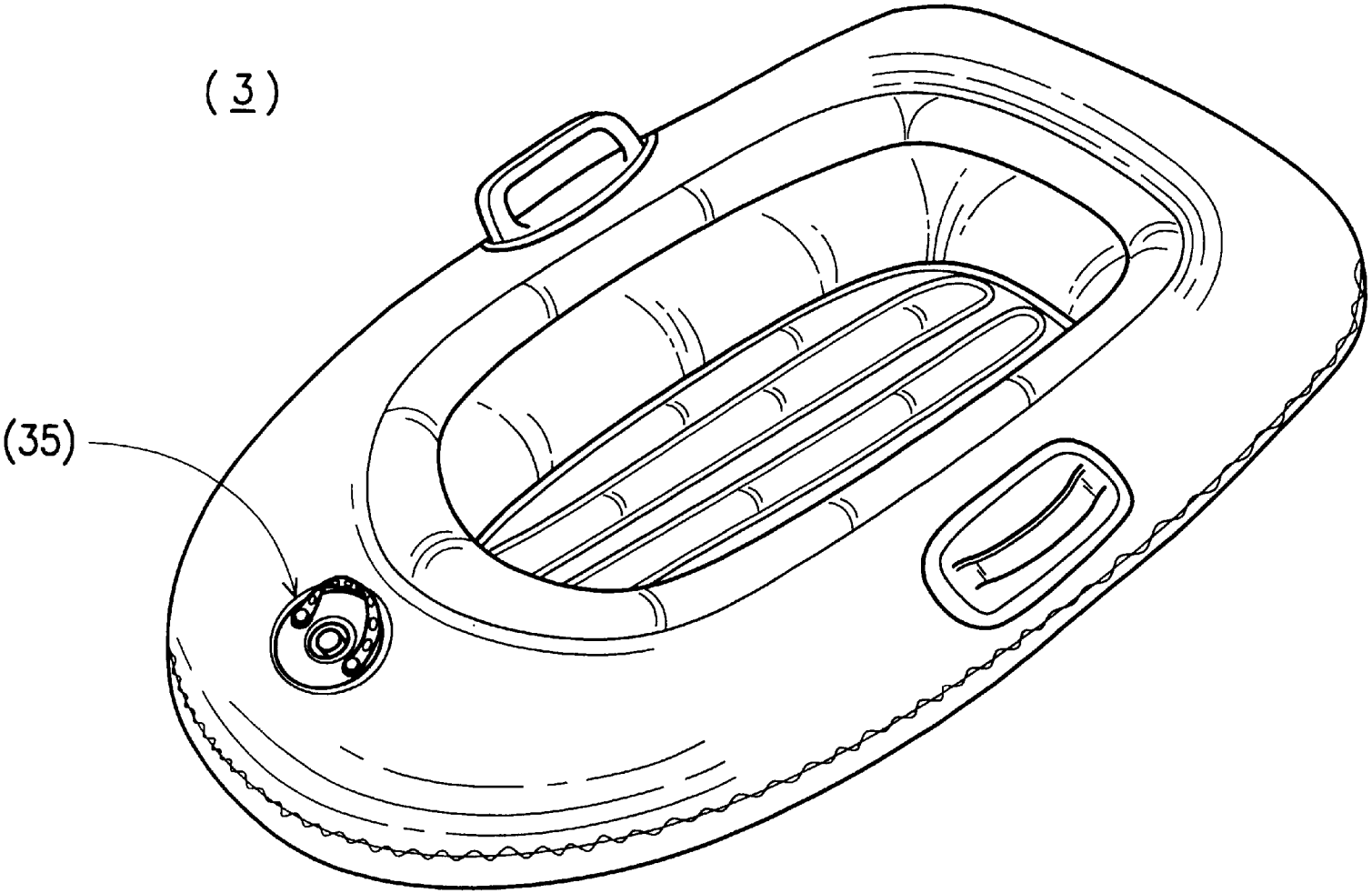
FIG. 4A shows a second application example of this invention, wherein an air pump is mounted in an inflatable boat.
Figure 4B:
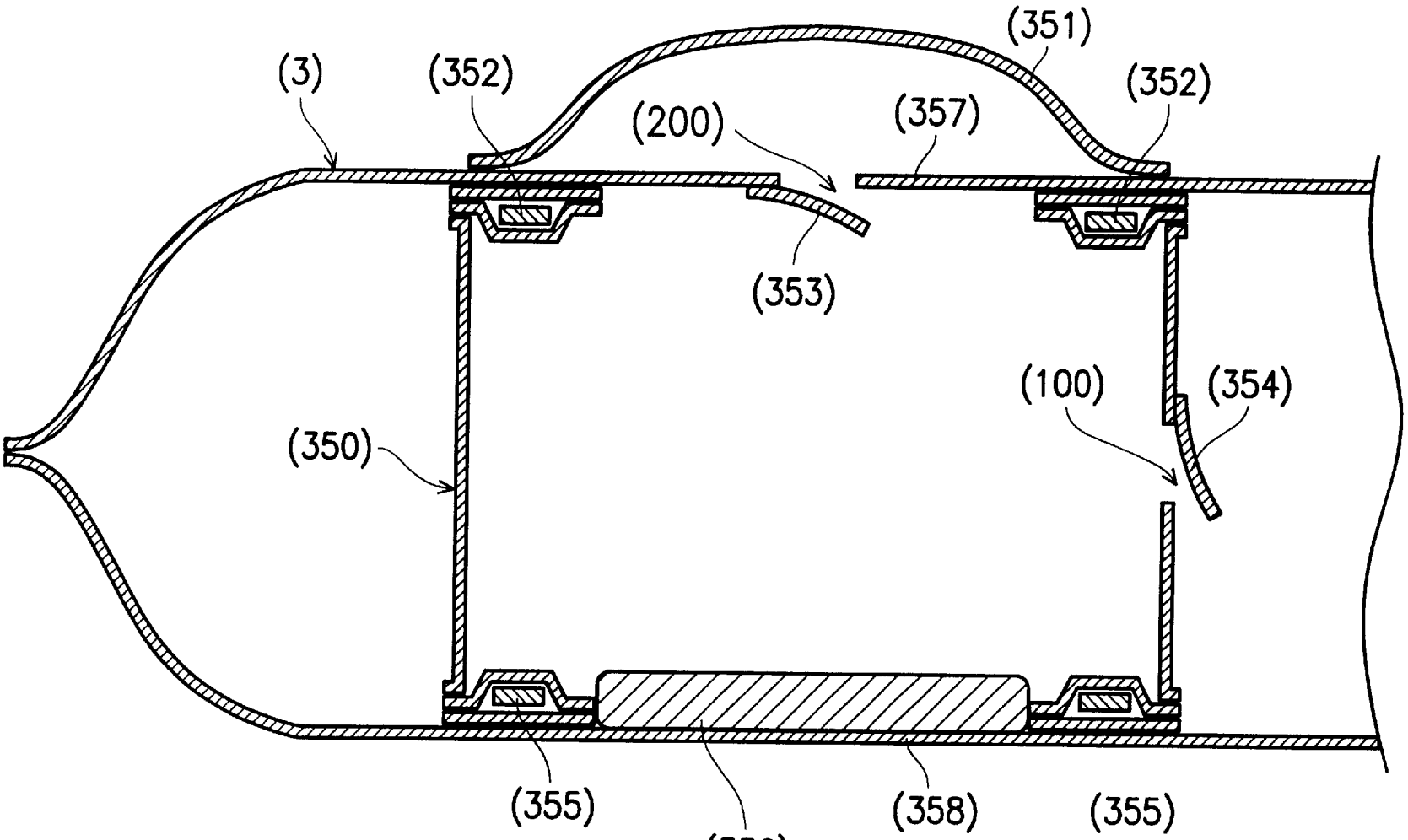
FIG. 4B is a sectional view of the air pump in FIG. 4A.

FIG. 4A and 4B show a second application example of this invention, wherein an air pump (35) is mounted in an inflatable boat (3). The air pump (35) has a pump body (350), a band (351) and a heavy weight (356), wherein the heavy weight (356) is firmly attached to the lower end (358) of the pump body (350). When the user pulls the band (351) to lift up the upper end (357) of the pump body (350), the heavy weight (356) resists the pull so that the pump body (350) can be expanded and the outside air (200) is sucked into the pump body (350) through a check valve (353) provided on the upper end (357). Reference numbers (352) and (355) are two stiff rings fixed on the upper end (357) and lower end (358) of the pump body (350). Reference number (354) is another check valve provided on the pump body (350) for allowing the air (100) to flow into the inflatable boat (3).

It is understood that the heavy weight (356) can be movably provided between the upper end (357) and the lower end (368) to function the same.

Figure 5A:
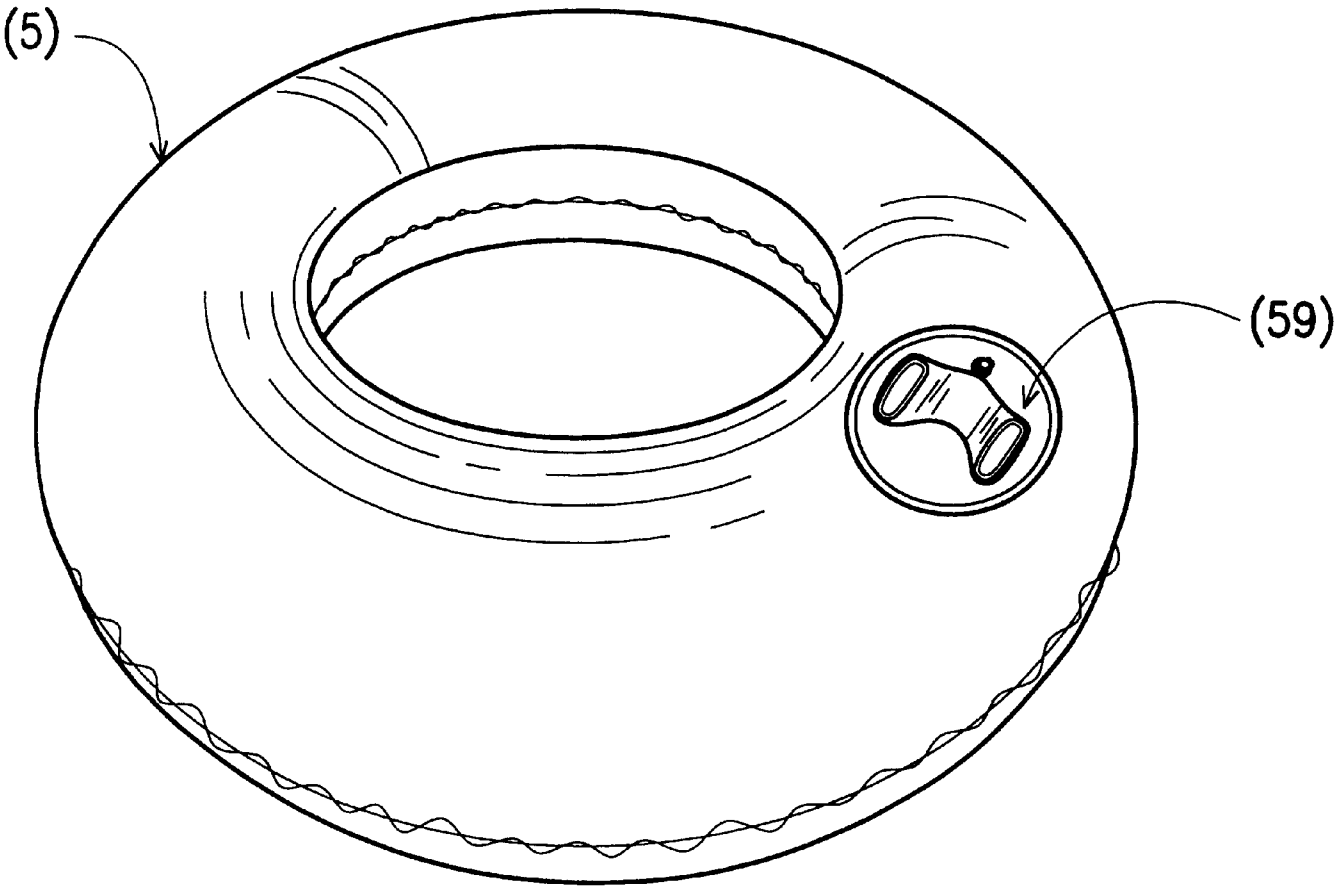
FIG. 5A shows a third application example of this invention, wherein an air pump is mounted in a swimming ring.
Figure 5B:
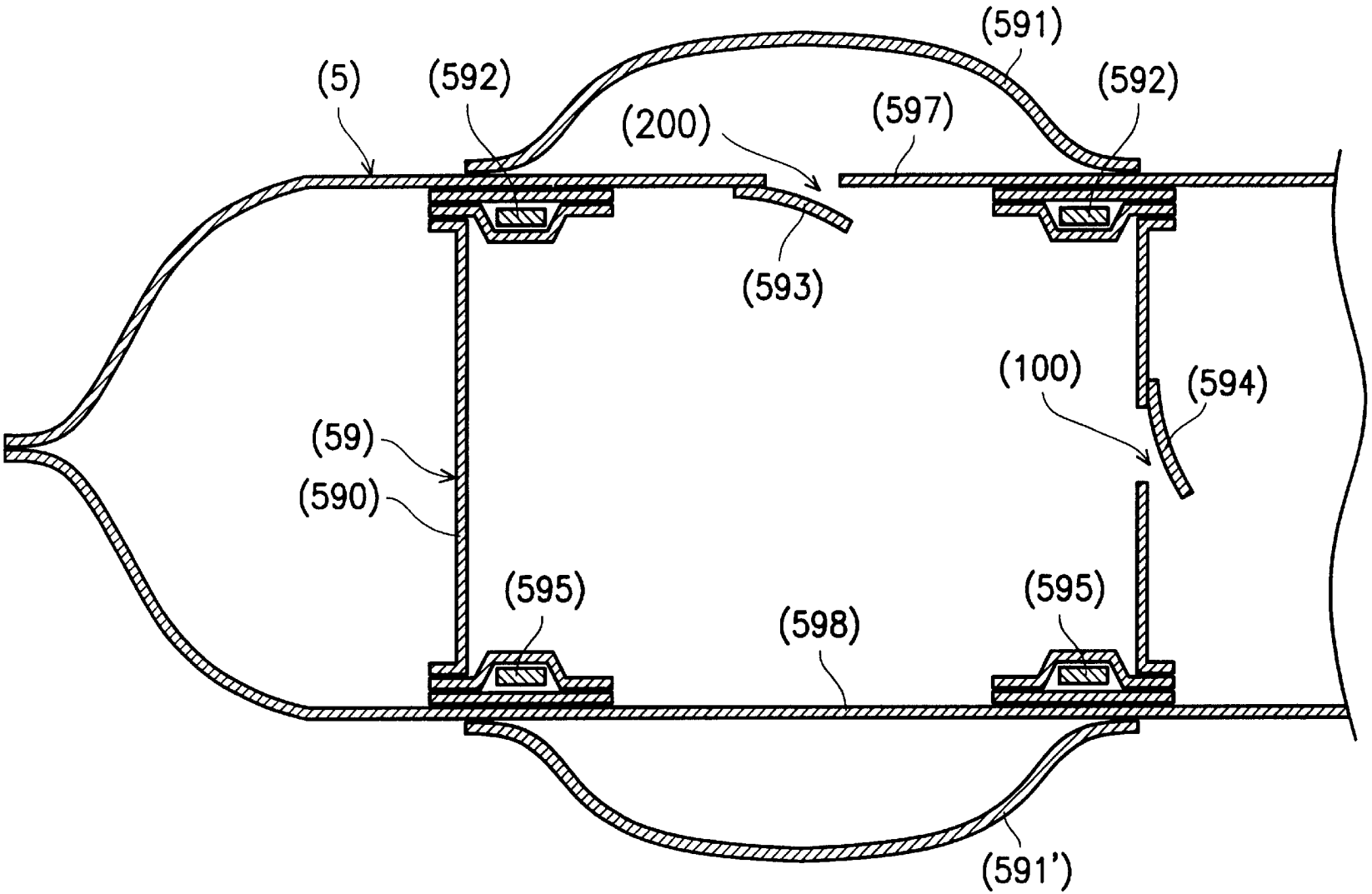
FIG. 5B is a sectional view of the air pump in FIG. 5A.

FIGS. 5A and 5B show a third application example of this invention, wherein an air pump (59) is mounted in a swimming ring (5). The air pump (59) has two bands (591), (591') attached to its opposite ends (597), (598). The user can expand the air pump (59) to suck outside air (200) into the pump body (590) by pulling the two bands (591), (591') in opposite directions. Reference numbers (592) and (595) are two stiff rings fixed on the upper end (597) and lower end (598) of the pump body (59O). Reference numbers (593) and (594) are two check valves provided on the pump body (590).

Figure 6B:
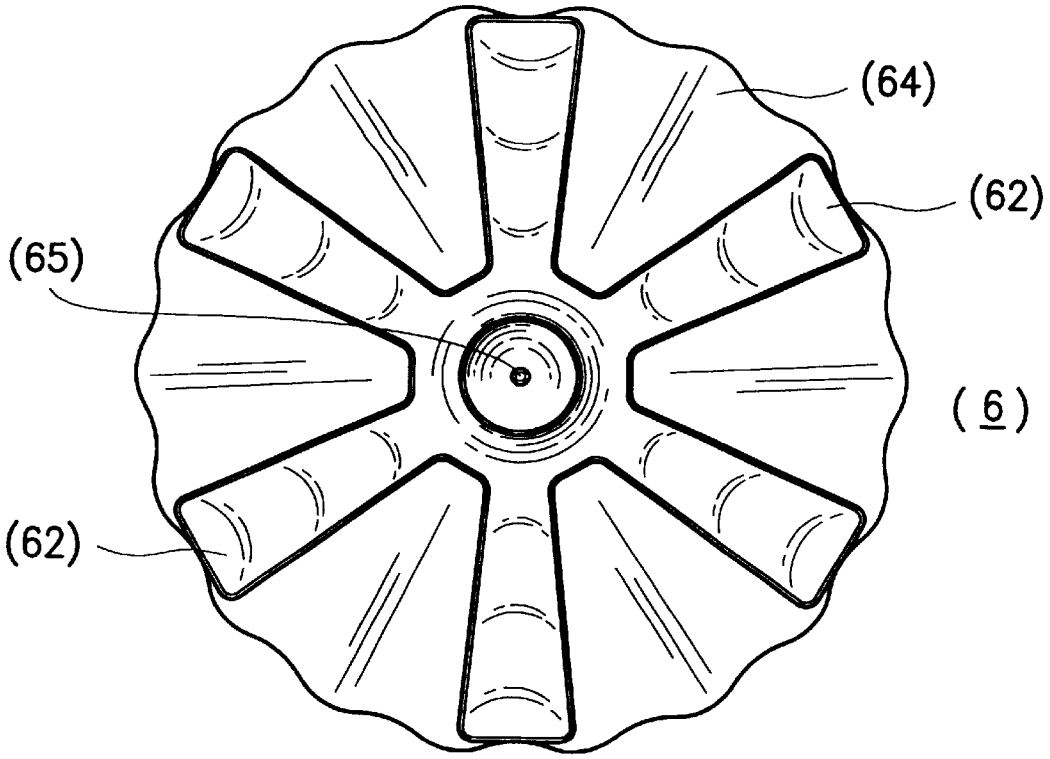
FIG. 6B is a top view of the umbrella in FIG. 6A.
Figure 6A:
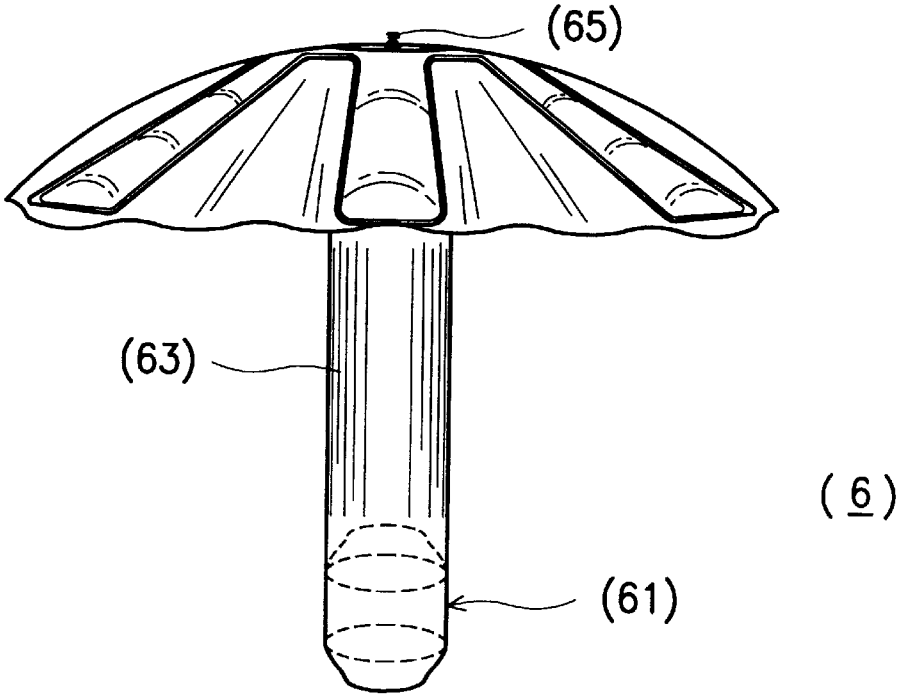
FIG. 6A shows a fourth application example of this invention, wherein an air pump is mounted in an umbrella.
Figure 6C:
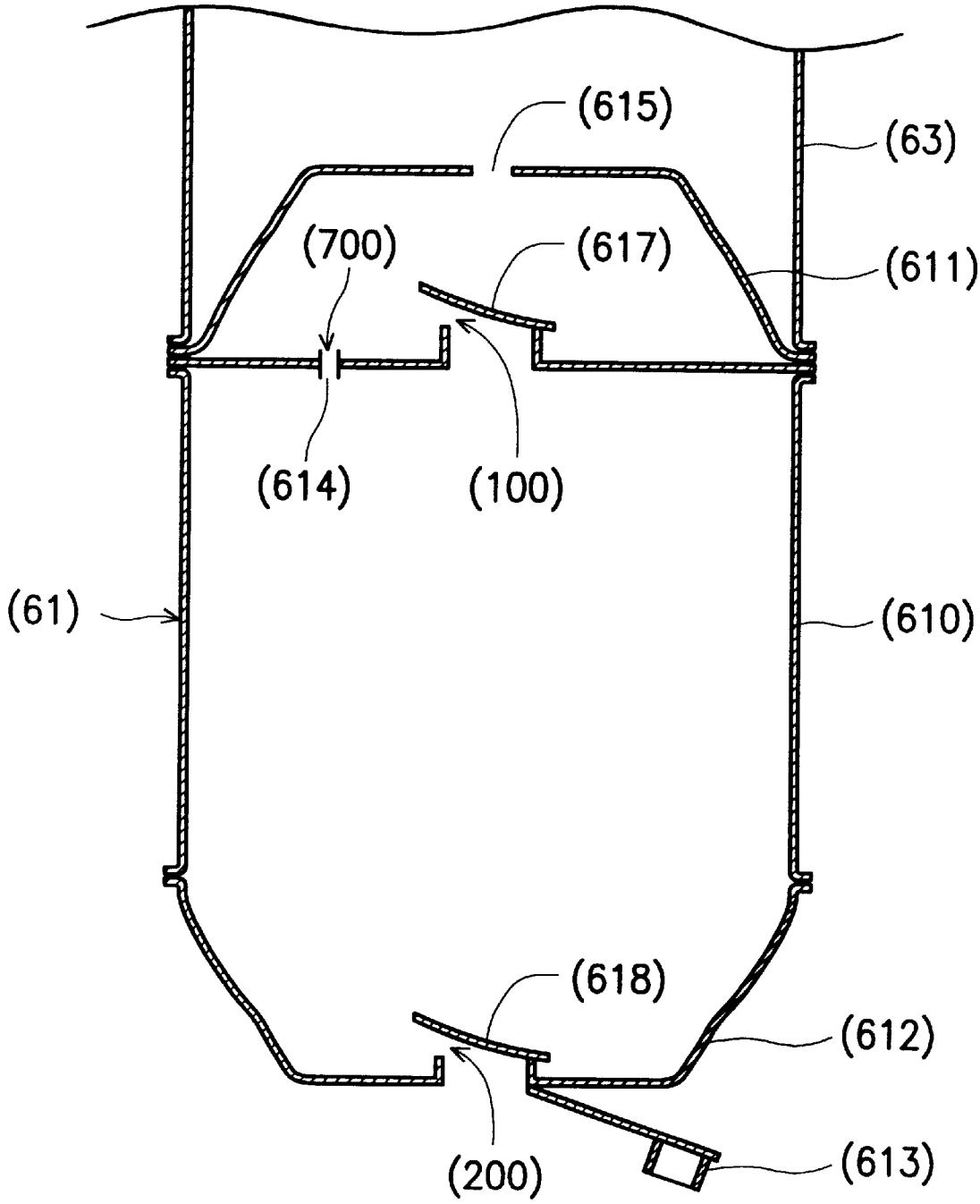
FIG. 6C is a sectional view of the air pump in FIG. 6A.

FIG. 6A, 6B and 6C show a fourth application example of this invention, wherein an air pump (61) is mounted in an umbrella (6). The umbrella (6) has an inflatable shaft (63), gores (64) and inflatable ribs (62) communicating the shaft (63). The air pump (61) is mounted on the bottom of the inflatable shaft (63) to push outside air (200) into the inflatable shaft (63) and further into the inflatable ribs (62). The inflatable shaft and ribs (62), (63) thus get stiff to support the gores (64).

The air pump (61) has flexible sides (610) and two stiff ends (611), (612) which are in the shape of a bowl (or in any proper shape). A check valve (617) and a back-flow hole (614) are provided in the bowl-shaped end (611) while an air outlet (615) is provided on the same end (611). Also, an air inlet are provided on the other end (612), where another check valve (618) and a valve cap (613) are mounted.

The user holds the two stiff ends (611), (612) and compresses the pump body to pump air (100), through the check valve (617) and the air outlet (615), into the inflatable shaft (63) and ribs (62). The pump body is flattened. Then, the user pulls the two stiff ends (611), (612) in opposite directions to restore the shape of the air pump (61). A small quantity of air (700) in the inflatable umbrella (6) can flow back to the pump body through the hole (614). Therefore, the whole inflatable shaft (63) including the air pump (61) can be filled with air after the pumping operations are finished. Then, the user closes the valve cap (613) to prevent air from leaking out.

If the user intends to stow the umbrella (6), he opens an air-discharging valve (65) provided thereon to discharge the air therein.

Figure 7A:
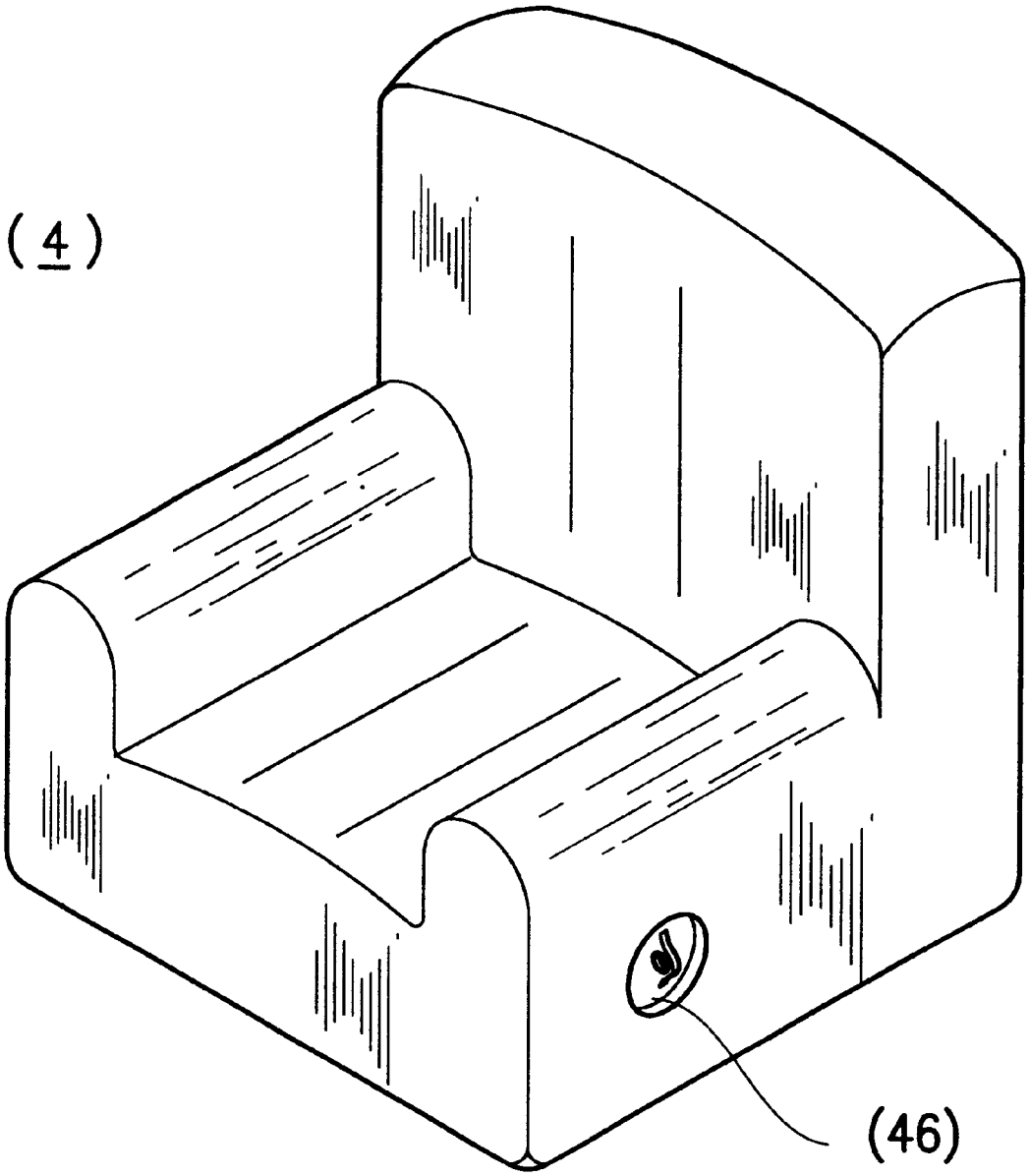
FIG. 7A shows a fifth application example of this invention, wherein an air pump is mounted in an inflatable sofa.
Figure 7B:
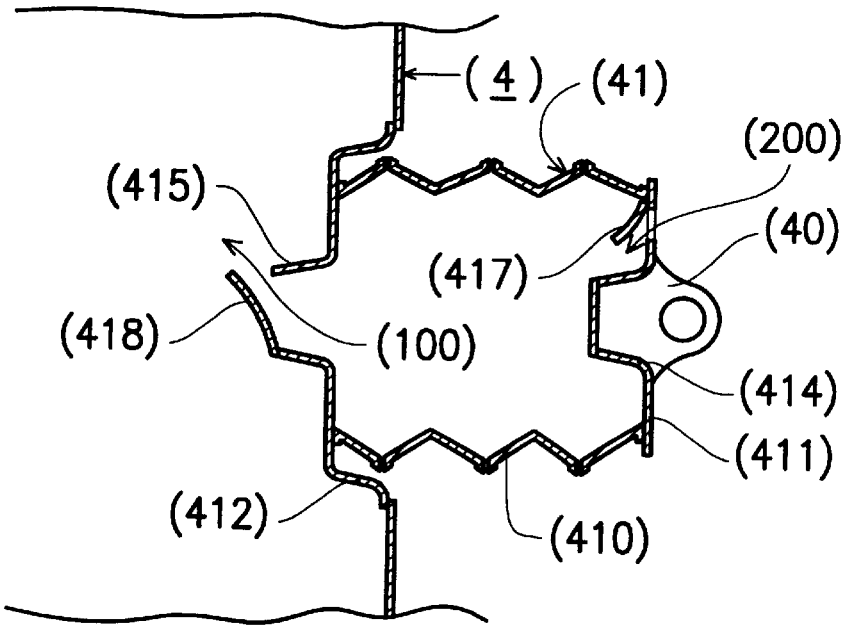
FIG. 7B is a sectional view of the air pump in FIG. 7A, which is in use.
Figure 7C:
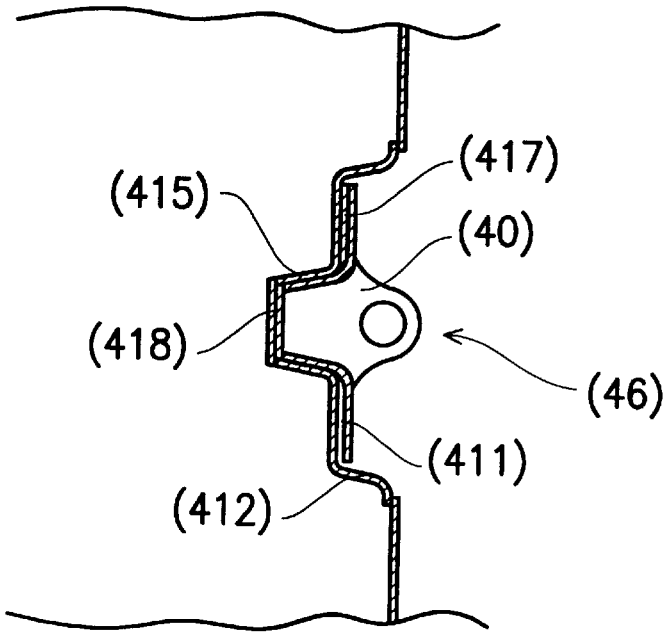
FIG. 7C is a sectional view of the air pump in FIG. 7B, which is not in use.

FIG. 7A, 7B and 7C show a fifth application example of this invention, wherein an air pump (46) is mounted in an inflatable sofa (4). The air pump (46) has a pump body (41) and a pulling ring (40). The pump body (41) comprises stiff ends (411), (412) and flexible sides (410). The pulling ring (40) is attached to the end (411) of the pump body (41).

The end (412) of the pump body (41) is in the shape of a bowl, on which a tapered sleeve (415) is formed. A tapered portion (414) is formed on the other end (411) of the pump body (41) and can be exactly fitted into the tapered sleeve (415) to ensure an air tightness while the air pump (46) is not in use, as shown in FIG. 7C. Also, two check valves (417), (418) are respectively provided at the ends (411), (412) of the pump body (41) in order to control air to flow in a single direction.

To operate the air pump (46), the user puts his finger into the ring (40) and pulls the end (411) of the pump body (41) to suck outside air (200) into the pump body (41) through the check valve (417). Then, he pumps the air (100) in the pump body (41) into the inflatable sofa (4) through the other check valve (418).

Figure 8:
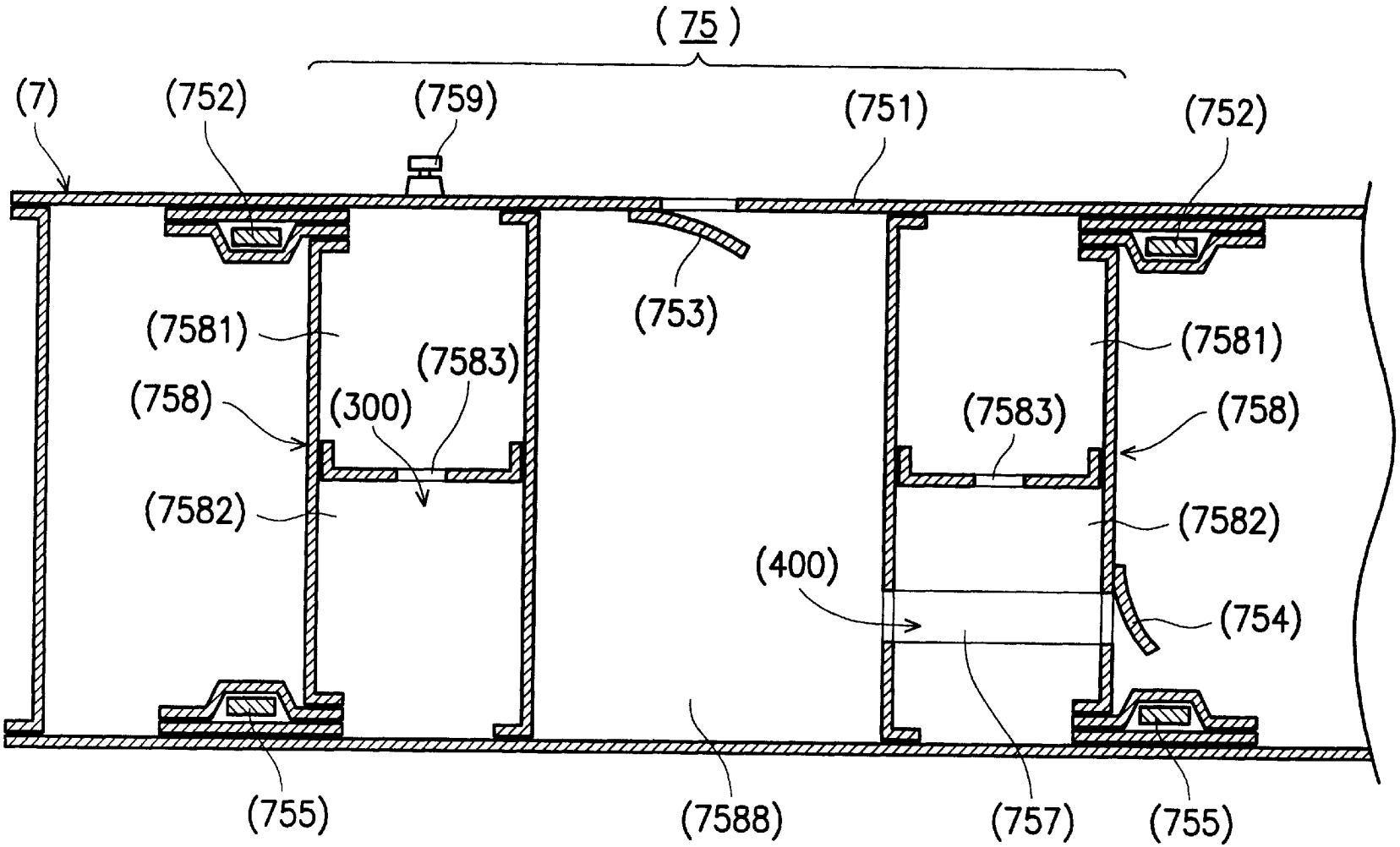
FIG. 8 is a sectional view of an air pump according to a sixth application example of this invention.
Figure 9:
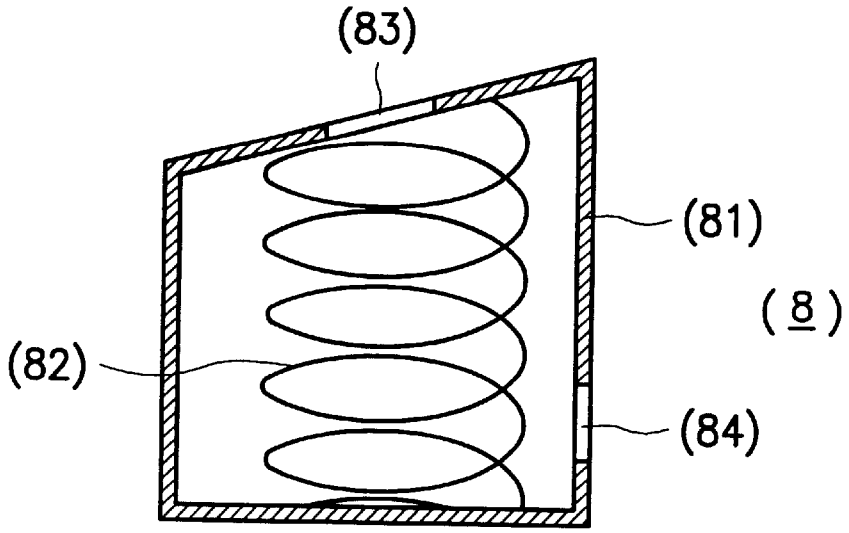
FIG. 9 (PRIOR ART)
FIG. 9 is a sectional view of an air pump according to the first example of the prior art.
Figure 10:
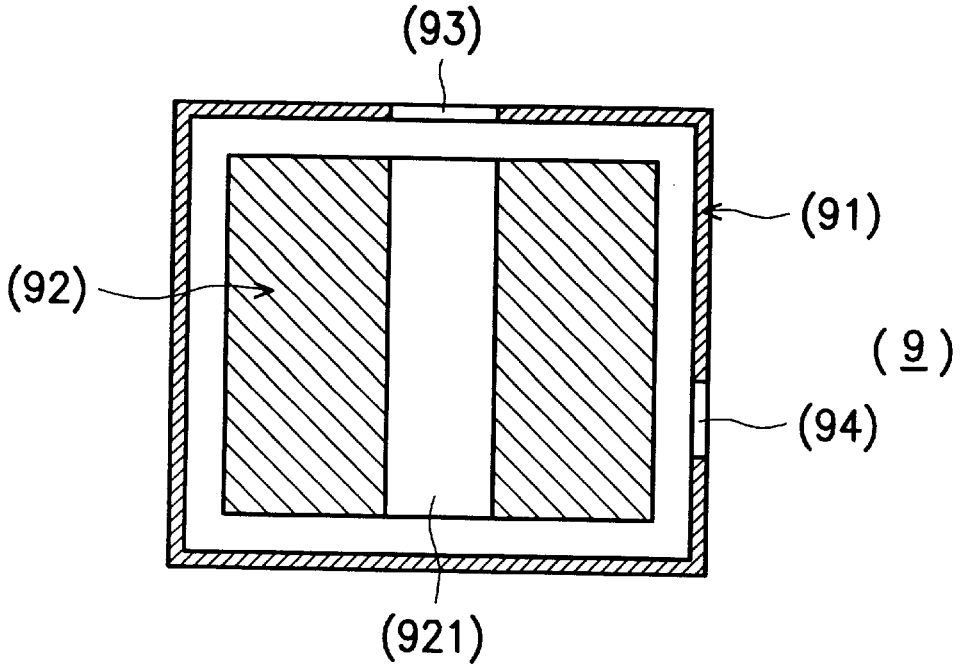
FIG. 10 (PRIOR ART)
FIG. 10 is a sectional view of another air pump according to the second example of the prior art.

FIG. 8 shows a sixth application example of this invention, wherein an air pump (75) is mounted in an inflatable product (7). The pump body (758) of the air pump (75) consists of a closed air bag (758). That is, an air chamber (7588) is surrounded by the air bag (758). The inside of the air bag (758) is divided into a first air cell (7581) and a second air cell (7582), and an opening (7583) is provided therebetween. Also, an air channel (757) is provided through the second air cell (7582) between the inflatable product (7) and the air chamber (7588). Reference numbers (753) and (754) are check valves. Reference numbers (752) and (755) are stiff rings. Reference number (759) is an inflation valve.

To operate the air pump (75), the user opens and pulls the inflation valve (759) up and allows outside air to flow into the first air cell (7581) and second air cell (7582), but not full, and then closes the inflation valve (759). Also, some outside air automatically enters the air chamber (7568) through the check valve (753).

Then, the user depresses the top end (751) of the air pump (75), so that some of the air (300) in the first air cell (7581) flows into the second air cell (7582), and the air (400) in the air chamber (7588) flows into the inflatable product (7) through the air channel (757). Then, he removes the depressing force. Some air in the second air cell (7582) automatically flows back to the first air cell (7581) so that the pump body (758) is restored. Also, outside air flows into the air chamber (7588) through the check valve (753) again. Repeating the above operations, the user can quickly pump enough outside air into the inflatable product (7).

Although this invention has been described in its preferred forms and various examples with a certain degree of particularity, it is understood that the present disclosure of the preferred forms and the various examples can be modified regarding the details of construction. The scope of the invention should be determined by the appended claims and not by the specific examples given herein.

What is claimed is:

1. An air pump for inflating an inflatable product, the air pump comprising:

a hollow pump body having an interior and an exterior;

the pump body having air located in the interior;

the pump body including flexible sides, a first [stiff] end and a second [stiff] end opposite to the first [stiff] end;

an air outlet provided on the pump body to discharge the air in the interior when the pump body is pressed;

at least one pulling member attached to the first [stiff] end of the pump body in order to restore the shape of the pressed pump body by pulling the pulling member; and an air inlet provided on the pump body to suck outside air into the pump body when the first [stiff] end is pulled by the pulling member to restore the pressed pump body shape; wherein:

the pump body is received in an inflatable body and the pulling member is kept outside [the] *an* inflatable body; and a weight [firmly] provided on the second [stiff] end of the pump body.

2. An air pump for inflating an inflatable product, the air pump comprising:

a hollow pump body having an interior and an exterior;

the pump body having air located in the interior;

the pump body including flexible sides, a first [stiff] end and a second [stiff] end opposite to the first [stiff] end;

an air outlet provided on the pump body to discharge the air in the interior when the pump body is pressed;

at least one pulling member attached to the first [stiff] end of the pump body in order to restore the shape of the pressed pump body by pulling the pulling member; and an air inlet provided on the pump body to suck outside air into the pump body when the first [stiff] end is pulled by the pulling member to restore the pressed pump body shape; wherein:

the pump body is received in the inflatable body and the pulling member is kept outside an inflatable body; and a weight movably provided between the first [stiff] end and the second [stiff] end.

3. An air pump for inflating an inflatable product, the air pump comprising:

a hollow pump body having an interior and an exterior;

the pump body having air located in the interior;

the pump body including flexible sides, a first [stiff] end and a second [stiff] end opposite to the first [stiff] end;

an air outlet provided on the pump body to discharge the air in the interior when the pump body is pressed;

at least one pulling member attached to the first [stiff] end of the pump body in order to restore the shape of the pressed pump body by pulling the pulling member; and an air inlet provided on the pump body to suck outside air into the pump body when the first [stiff] end is pulled by the pulling member to restore the pressed pump body shape; wherein:

the pump body is [firmly] received in an inflatable body;

the pulling member is kept outside [the] *an* inflatable body; and a ring weight movably provided around the pump body.

4. An air pump for inflating an inflatable product, the air pump comprising:

a hollow pump body having an interior and an exterior;

the pump body having air located in the interior;

the pump body including flexible sides, a first stiff end and a second stiff end opposite to the first stiff end;

an air outlet provided on the pump body to discharge the air in the interior when the pump body is pressed;

at least one pulling member attached to the first stiff end of the pump body in order to restore the shape of the pressed pump body by pulling the pulling member; and an air inlet provided on the pump body to suck outside air into the pump body when the first stiff end is pulled by the pulling member to restore the pressed pump body shape; wherein:

the air pump has two pulling members respectively attached to the first and second stiff ends;

the pump body is [firmly] received in an inflatable body; and the pulling members are kept outside [the] *an* inflatable body.

5. An air pump for inflating an inflatable product, the air pump comprising:

a hollow pump body having and interior and an exterior and having air located in the interior and including flexible sides, a first stiff end and a second stiff end opposite to the first stiff end;

an air outlet provided on the pump body to discharge the air in the interior when the first and second stiff ends are pressed to flatten the pump body; and an air inlet provided on the pump body to suck outside air into the pump body; when the first and second stiff ends are pulled to restore the shape of the pump body;

said air pump being mounted inside the inflatable body of an inflatable product;

the first end of the air pump is curved and received in the inflatable body; and at least one air hole being provided in the first curved end of the air pump in order to allow air in the inflatable body to flow back to the air pump.

6. An air pump for inflating an inflatable product, the air pump comprising:

a hollow pump body having and interior and an exterior and having air located in the interior and including flexible sides, a first stiff end and a second stiff end opposite to the first stiff end;

an air outlet provided on the pump body to discharge the air in the interior when the first and second stiff ends are pressed to flatten the pump body; and an air inlet provided on the pump body to suck outside air into the pump body; when the first and second stiff ends are pulled to restore the shape of the pump body; wherein:

the first end and the second end are complementary to each other so that they can be exactly fitted together to generate an air tightness.

* * * * *